United States Patent [19]

Heismann et al.

[11] Patent Number: 5,327,511
[45] Date of Patent: Jul. 5, 1994

[54] APPARATUS AND METHOD EMPLOYING FAST POLARIZATION MODULATION TO REDUCE EFFECTS OF POLARIZATION HOLE BURNING AND POLARIZATION DEPENDENT LOSS

[75] Inventors: Fred L. Heismann, Freehold; Robert L. Rosenberg, Fair Haven, both of N.J.

[73] Assignee: AT&T Bell Laboratories, Murray Hill, N.J.

[21] Appl. No.: 79,432

[22] Filed: Jun. 18, 1993

[51] Int. Cl.$^5$ .............................................. G02B 6/10
[52] U.S. Cl. .......................................... 385/1; 385/3; 385/14
[58] Field of Search ...................................... 385/1–3, 385/11, 14, 27, 129

[56] References Cited

U.S. PATENT DOCUMENTS

| | | | |
|---|---|---|---|
| 4,773,759 | 9/1988 | Bergh et al. | 356/350 |
| 4,901,728 | 2/1990 | Hutchinson | 128/633 |
| 5,009,230 | 4/1991 | Hutchinson | 128/633 |
| 5,212,743 | 5/1993 | Heismann | 385/11 |
| 5,247,382 | 9/1993 | Suzuki | 359/156 |
| 5,253,309 | 10/1993 | Nazarathy et al. | 385/4 |

OTHER PUBLICATIONS

IEEE Journal of Quantum Electronics, vol. QE-19, No. 11, pp. 1704–1717, Nov. 1983, "Spectral and Polarization Hole Burning in Neodymium Glass Lasers" by Douglas W. Hall, et al.

Journal of Lightwave Technology, vol. 6, No. 6, (ISSN 0733-8724), pp. 838–845, Jun. 1990, "Analysis of Input-Polarization-Induced Phase Noise in Interferometric Fiber-Optic Sensors and Its Reduction Using Polarization Scrambling" by Alan D. Kersey, et al.

Journal of Lightwave Technology, vol. 6, No. 10, (ISSN 0733-8724), pp. 1599–1609, Oct. 1988, "Optimization and Stabilization of Visibility in Interferometric Fiber-Optic Sensors Using Input-Polarization Control" by A. D. Kersey, et al.

Electronics Letters, vol. 23, No. 12, pp. 634–636, Jun. 4, 1987, "Monomode Fibre Polarisation Scrambler" by A. D. Kersey, et al.

Electronics Letters, vol. 23, No. 10, pp. 513–514, May 7, 1987, "Polarisation-Insensitive Heterodyne Detection Using Polarisation Scrambling" by T. G. Hodgkinson, et al.

Electronics Letters, vol. 24, No. 15, pp. 931–933, Jul. 21, 1988, "Input-Polarisation Scanning Technique for Overcoming Polarisation-Induced Signal Fading in Interferometric Fibre Sensors" by A. D. Kersey, et al.

Optics Letters, vol. 16, No. 6, Mar. 15, 1991, pp.

(List continued on next page.)

*Primary Examiner*—Frank Gonzalez
*Attorney, Agent, or Firm*—Thomas Stafford

[57] ABSTRACT

The effects of polarization dependent hole burning and polarization dependent loss are reduced by modulating the state of polarization (SOP) of an optical signal being launched into an optical transmission path periodically between first and second states of polarization of at least one pair of orthogonal states of polarization. Preferably, the SOP is modulated at a rate that is substantially higher than $1/t_s$, where $t_s$ is the anistropic saturation time of the optical amplifier. Ideally, the state of polarization of the launched optical signal should be modulated such that it traces a complete great circle on the Poincaré sphere. In addition, the effects of polarization dependent loss are further reduced by controllably selecting the particular great circle being traced on the Poincaré sphere. In one example, the particular great circle being traced is selected such that a predetermined parameter, for example, the signal to noise ratio, of the optical information signal being received at the remote end of the optical transmission network is maintained at a prescribed value, e.g., a maximum value. In an embodiment of the invention, the great circle is traced at a uniform speed such that the launched optical signal spends equal time intervals in both states of any pair of orthogonal states of polarization on the selected great circle on the Poincaré sphere.

29 Claims, 7 Drawing Sheets

OTHER PUBLICATIONS 381-383, "Depolarized source for fiber-optic applications" by W. K. Burns, et al.

Proceedings of the SPIE—The International Society for Optical Engineering, vol. 838, Mar. 15, 1991, pp. 360-364, "Single-Mode Fiber Pseudo-Depolarizer" by A. D. Kersey, et al.

Conference on Optical Fiber Communication/International Conference on Integrated Optics and Optical Fiber Communication, OFC '93/IOOC '93, San Jose, Calif., Feb. 21-26, 1993, Post-Deadline Paper (PD5-1), "Observation of new polarisation dependence effect in long haul optically amplified system" by M. G. Taylor.

APPARATUS AND METHOD EMPLOYING FAST POLARIZATION MODULATION TO REDUCE EFFECTS OF POLARIZATION HOLE BURNING AND POLARIZATION DEPENDENT LOSS

CROSS-REFERENCE TO RELATED APPLICATION

U.S. patent application Ser. No. 08/079,437 (still pending) was filed concurrently herewith.

TECHNICAL FIELD

This invention relates to the optical transmission of information and, more particularly, to improving transmission capabilities over long-distance optical transmission paths employing repeaters.

BACKGROUND OF THE INVENTION

Very long optical fiber transmission paths, such as those employed in undersea or trans-continental terrestrial lightwave transmission systems including optical-amplifier repeaters, are subject to decreased performance caused by a host of possible impairments. The impairments typically increase as a function of the length of the optical transmission. In long optical transmission paths that include optical amplifiers, the impairments tend to vary with time and cause a random fluctuation in the signal-to-noise ratio (SNR) of the optical transmission path. The random fluctuation in SNR contributes to a phenomenon known as signal fading. The SNR fluctuations also result in an increased average bit error ratio (BER) in digital signals being transmitted over the optical transmission path. When the SNR of a digital signal being transported on such an optical transmission path becomes unacceptably small relative to the average SNR (resulting in an undesirably high BER), a signal-to-noise fade is said to have occurred. Experimental evidence has shown that the signal fading and SNR fluctuations are caused by a number of polarization dependent effects induced by the optical fiber itself and/or other optical components within the transmission path. In particular, one of these effects has now been identified as polarization dependent hole burning (PDHB), which is related to the population inversion dynamics of the optical amplifiers. A discussion of hole-burning can be found in an article by D. W. Douglas, R. A. Haas, W. F. Krupke and M. J. Weber, entitled "Spectral and Polarization Hole Burning in Neodymium Glass Lasers"; *IEEE Journal of Quantum Electronics*, Vol. QE-19, No. 11, November 1983.

PDHB reduces gain of the optical amplifiers within the long optical transmission path for any signal having a state of polarization ("SOP") parallel to that of a polarized primary optical signal carried by the transmission path. However, the gain provided by these amplifiers for optical signals which have an SOP orthogonal to that of the primary signal remains relatively unaffected. In simplified terms, the primary optical signal produces an anisotropic saturation of the amplifier that is dependent upon the SOP of the primary optical signal. The polarized primary signal reduces the level of population inversion anisotropically within the amplifier, and results in a lower gain for optical signals in that SOP. This effectively causes the amplifier to preferentially enhance noise having an SOP orthogonal to that of the primary signal. This enhanced noise lowers the SNR of the transmitted information and causes an increased BER.

Additionally, it is also desirable to reduce the effects of polarization dependent loss (PDL) caused by the dichroism of the optical components in the repeater. Such components have orthogonal principal dichroic axes that define the highest-loss and lowest-loss SOPs incident on them. If elliptical SOPs have their principal axes aligned with those of the dichroic, dichroic losses can, with some low probability, accumulate substantially along a cascade. The condition for substantial accumulation of dichroic losses may be stated as follows: During a significant fraction of a polarization-modulation ("scrambling") cycle of the optical signal launched into the transmission network, the major axes of the elliptical SOPs incident on the dichroic elements tend to align with the high-loss axes of the dichroics. (In other parts of the scrambling cycle, the major SOP axes will then align with the low-loss axes of the dichroics. Such alignments do not cause fading.) The damaging fading occurs during the portion of each scrambling cycle that favors polarized-signal losses. The fading persists as long as an accidental high-loss alignment of any principal-axis pairs persists over a substantial fraction of a scrambling cycle.

A prior method for reducing signal fading employs a two-wavelength light source to transmit information in two orthogonal states of polarization over an optical fiber transmission path. Since a this light source shares its optical power equally on any two orthogonal SOPs within the fiber, deleterious polarization-dependent effects may be reduced as long as the two wavelengths remain orthogonally polarized along the optical transmission path.

SUMMARY OF THE INVENTION

The effects of polarization dependent hole burning and polarization dependent loss are reduced, in accordance with the principles of the invention, by modulating the state of polarization (SOP) of an optical signal being launched into the transmission path periodically between first and second states of polarization of at least one pair of orthogonal states of polarization. In addition, the effects of polarization dependent loss further reduced by controllably transforming the sequence of modulated states of polarization into a preferred sequence. Preferably, the SOP is modulated at a rate that is substantially higher than $1/t_s$, where $t_s$ is the anistropic saturation time of the optical amplifier. Ideally, the state of polarization of the launched optical signal should be modulated such that it traces a complete great circle on the Poincaré sphere. In one example, the particular great circle being traced is controllably selected such that a predetermined parameter, for example, the signal to noise ratio, of the optical information signal being received at the remote end of the optical transmission network is maintained at a prescribed value, e.g., a maximum value. In the preferred embodiment of the invention, the great circle is traced at a uniform speed such that the launched optical signal spends equal time intervals in both states of any pair of orthogonal states of polarization on the selected great circle on the Poincaré sphere.

Thus, the function of the polarization-feedback controller is to change the scrambling trajectory on the Poincaré sphere so as to minimize high-loss alignments of principal-axis pairs.

DETAILED DESCRIPTION

Figure 1:
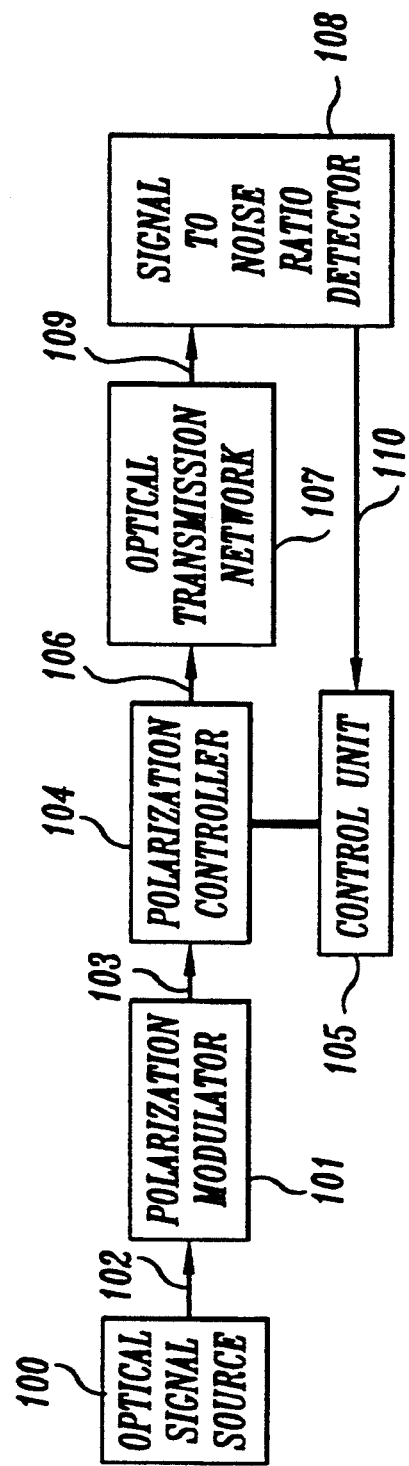
FIG. 1 is a simplified block diagram of an arrangement including a polarization modulator and polarization controller which facilitate the practice of the invention.

FIG. 1 shows a simplified block diagram of an exemplary arrangement facilitating the practice of the invention. As shown, the embodiment includes polarization modulator 101 which is employed to modulate the SOP of an optical information signal from optical signal source 100 to be supplied via polarization controller 104 as output optical signal 106 to optical transmission network 107 and, thereby, to a remote receiver including signal to noise ratio (SNR) detector 108. SNR detector 108 generates a representation of the SNR of the received optical information signal 109 which, in turn, is supplied via circuit path 110 to control unit 105. Although SNR is being employed in this example, it will be apparent to those skilled in the art that some other predetermined parameter of received optical signal 109 may equally be employed in controlling polarization via control unit 105. Control unit 105 generates voltages for controlling operation of polarization controller 104, as will be described below. Thus, optical information signal 102 is launched into polarization modulator 101 and the resulting modulated optical information signal 103 is supplied to polarization controller 104. Optical information signals such as 102 are produced by a laser transmitter (not shown) in optical signal source 100, in well-known fashion. Specifically, the polarization state of optical signal 102 being supplied to polarization modulator 101 is such as to assure adequate modulation through pairs of orthogonal polarization states. Polarization modulator 101 operates to modulate the state of polarization of optical signal 102 periodically between states of one or more pairs of orthogonal states of polarization as, in one example, a complete great circle is being traced on the Poincaré sphere. As further described below, polarization controller 104 under control of control unit 105 in response to the SNR value operates to select the particular great circle being traced on the Poincaré sphere such that the SNR value is at a maximum. That is, polarization controller 104 under control of control unit 105 transforms the sequence of states of polarization of the modulated optical signal 103 into a preferred sequence of states of polarization.

Figure 2:
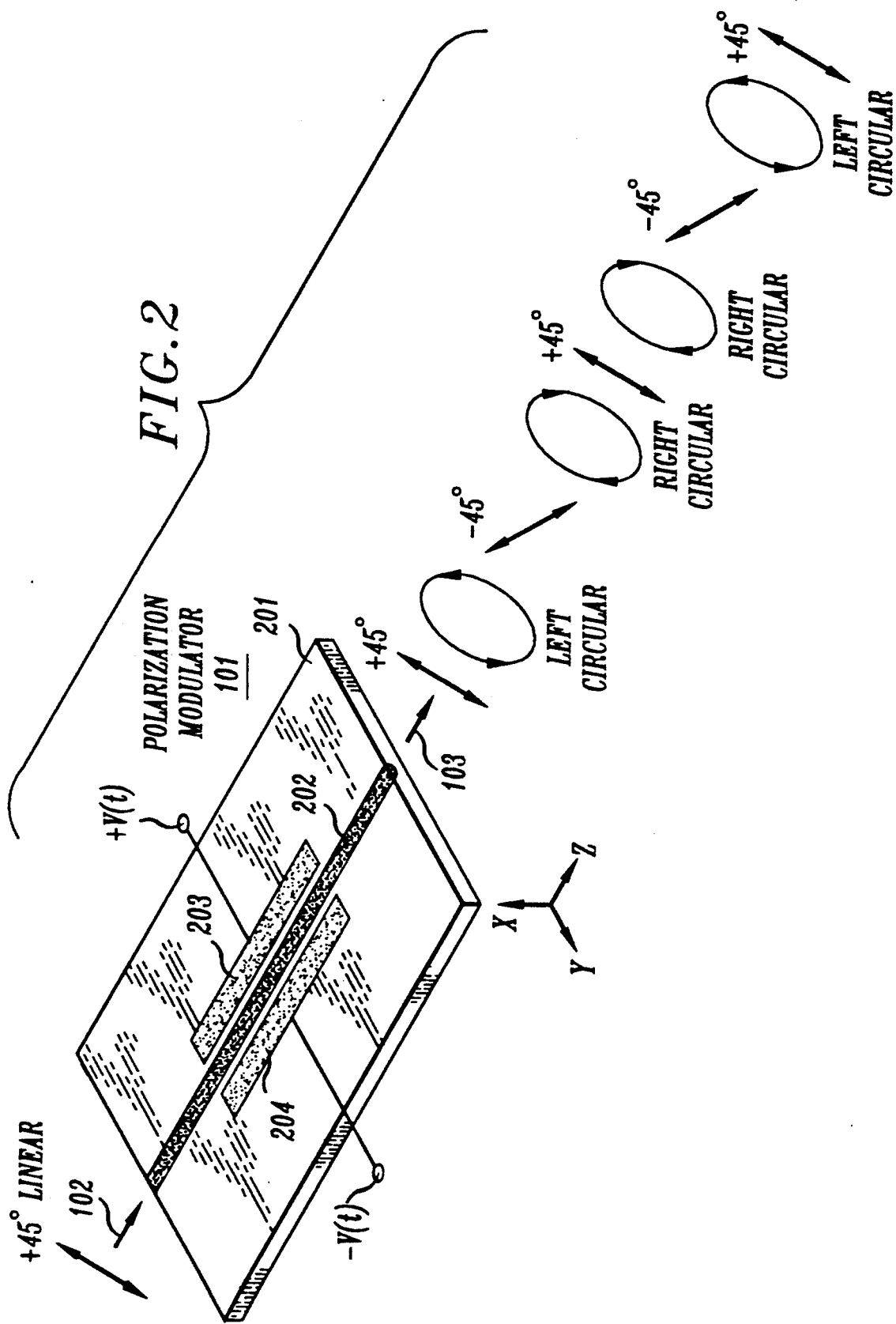
FIG. 2 shows a view of the waveguide and electrode structure of one arrangement which may be employed for the polarization modulator of FIG. 1.

FIG. 2 shows one embodiment of polarization modulator 101 which may be advantageously used in practicing the invention. An integrated-optic realization of polarization modulator 101 is fabricated on low-birefringence X-cut, Z-propagating LiNbO$_3$ substrate 201 and operates with a standard titanium-indiffused, single mode waveguide 202. It includes two electrodes 203 and 204 disposed on substrate 201 on both sides of waveguide 202.

The embodiment of polarization modulator 101 shown in FIG. 2 operates to retard the polarization component of the incoming optical signal 102 parallel to the X axis (TM mode) relative to the polarization component of the incoming optical signal parallel to the Y axis (TE mode). The TE-TM mode phase shift is induced via the $r_{22}$ and $r_{12}$ ($r_{22}=-r_{12}=3.4 \cdot 10^{-12}$ m/V) electro-optic coefficients by applying balanced drive voltage components $V(t)$ and $-V(t)$ to electrodes 203 and 204, thereby inducing an electric field $E_y$ in waveguide 202. The total induced phase shift $\phi(t)$ between the X and Y polarized components is $$\phi(t) = \Gamma(r_{12} - r_{22}) \frac{2\pi}{\lambda} \cdot \frac{V(t)}{G} \cdot L\, n_o^3 \qquad (1)$$

where t is time, $\lambda$ is the free-space wavelength, G is the gap between electrodes 203 and 204, L is the length of electrodes 203 and 204, $n_o$ is the ordinary index of refraction and $\Gamma$ is a normalized overlap parameter between the optical and electrical fields.

The optical information signal 102 is launched into waveguide 202 of polarization modulator 101 having equal components of polarization along the X and Y axes. Modulation of the drive voltages applied to two electrodes 203 and 204 then causes the output polarization state of the resulting modulated optical signal 103 to move along a polar great circle on the Poincaré sphere. If the drive voltages $V(t)$ and $-V(t)$ being applied to electrodes 203 and 204 are periodically modulated such that the peak-to-peak voltage amplitude induces a total phase shift $\Delta\phi(t)=\pi$, then the SOP of output optical signal 103 is periodically modulated between two orthogonal polarization states. If the peak-to-peak voltage amplitude being applied to electrodes 203 and 204 is adjusted to induce a total phase shift of $\Delta\phi(t)=2\pi$, then the SOP of output optical signal 103 traces a full great circle on the Poincaré sphere. In a preferred embodiment of the invention, the drive voltages applied to electrodes 203 and 204 of polarization modulator 101 are symmetric sawtooth voltages of the form $$V(t) = V_{90}(-1)^n(4ft-2n), \text{ for } 2n-1 \leq 4ft \leq 2n+1, \qquad (2)$$

where t is time, n is an arbitrary integer, 1/f is the sawtooth period, and $V_\pi$ is the voltage for inducing a phase shift of $\Delta\phi(t)=\pi$. Preferably, the modulation of the SOP is at a rate substantially higher than $1/t_s$, where $t_s$ is the anisotropic saturation time of the optical amplifier (typically 1 ms). A suitable modulation rate with present erbium-doped optical fiber amplifiers is $\geq 20$ kHz.

In the example shown in FIG. 2, polarization modulator 101 operates to modulate an incoming optical information signal 102 having a 45° linear SOP relative to the X and Y axes. In response to the symmetrical sawtooth drive voltages V(t) and −V(t), noted above in equation (2), being applied to the modulator electrodes 203 and 204, respectively, the SOP of the optical signal 103 emerging as an output from modulator 101 traces a complete polar great circle on the Poincaré sphere and, then, returns in the opposite direction to the point of beginning, as shown in FIG. 2. Thus, in a steady state condition, the SOP of optical signal 103 proceeds through the sequence of polarization states shown, namely: 45° linear, left circular, −45° linear, right circular, 45° linear, right circular, −45° linear, left circular, etc. It is noted that the SOP of the optical information signal 102 could be circular, if desired, or elliptical with a principal axis at ±45°. Then, the modulation of the SOP of output optical signal 103 will begin at a different point in the sequence, move all the way around a great circle on the Poincaré sphere, and then return along the great circle to the point of beginning.

If desired, balanced sinusoidal drive voltages could be employed to provide the modulation, namely, $$V(t) = V_m \sin(2\pi f t) \quad (3)$$

However, use of the sinusoidal drive voltages will cause the polarization states to be traced along a great circle on the Poincaré sphere with non-uniform speed. In the case of $V_m = V_\pi$, the modulated optical signal 103 traces a full great circle on the Poincaré sphere, but will spend unequal time intervals in the orthogonal polarization states. Nevertheless, different values of $V_m$, causing incomplete or overcomplete great circles to be traced on the Poincaré sphere under sinusoidal drive voltages, can also be used to equalize PDHB effects through appropriate non-uniform weighting of the SOPs. The general requirement is that $V_m$ must be selected to cause the average degree of polarization to vanish over a single modulation cycle. In the case of $V_m = 0.7655 \cdot V_\pi$, for example, the modulated optical signal 103 will trace only 76% of a full great circle on the Poincaré sphere, but the modulated optical signal 103 will, on average, be completely depolarized.

Figure 3:
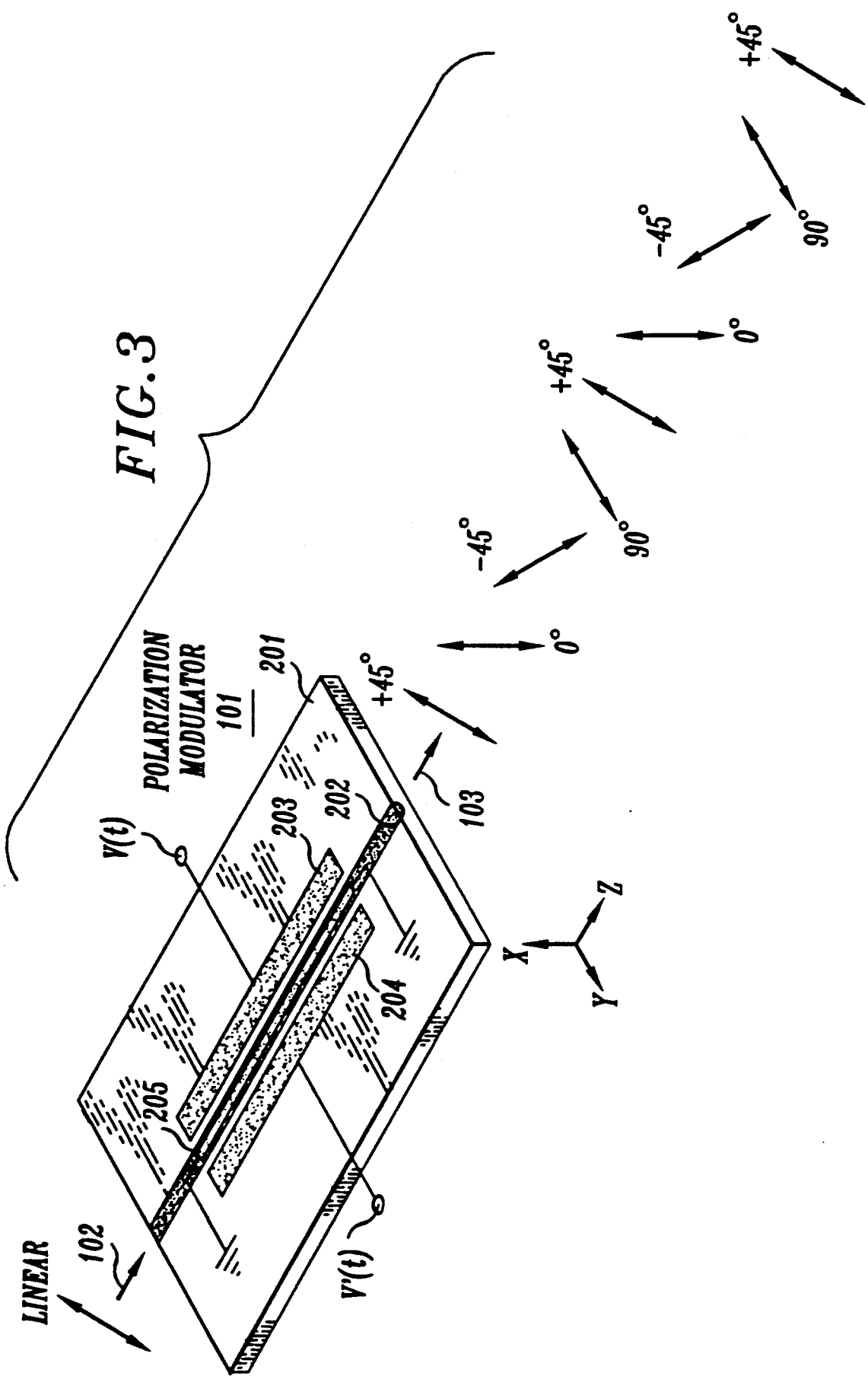
FIG. 3 shows a view of still another waveguide and electrode structure which can be utilized for the polarization modulator of FIG. 1.

FIG. 3 shows another embodiment of polarization modulator 101 which also may be employed in practicing the invention. Again, an integrated optic realization of polarization modulator 101 is fabricated on low-birefringence X-cut, Z-propagating LiNbO$_3$ substrate 201 and operates with a standard titanium-indiffused, single mode waveguide 202. It includes three electrodes, two of which, i.e., 203 and 204, are disposed on both sides of waveguide 202 and one common ground electrode 205 on the top of waveguide 202. This embodiment of modulator 101 operates in a similar fashion to an endlessly rotating half-wave plate, i.e., it generates a constant phase retardation of $\pi$ at a variable orientation. This is achieved by inducing a variable combination of TE-TM phase shifting and TE⇌TM mode conversion.

TE⇌TM mode conversion is accomplished via the $r_{61}$ ($r_{61} = -r_{22}$) electro-optic coefficient by applying balanced drive voltages V(t)=V'(t) to the side electrodes 203 and 204, thereby inducing an electric field $E_x$ in the waveguide 202. The phase retardation $\eta(t)$ for mode conversion induced in an electrode section of length L is $$\eta(t) = \Gamma r_{61} \frac{2\pi}{\lambda} \cdot \frac{V(t)}{G} \cdot L n_o^3 \quad (4)$$

where t is time, $\lambda$ is the free-space wavelength, G is the gap between the ground electrode 205 and the side electrodes 203 and 204, L is the length of electrodes 203, 204 and 205, $n_o$ is the ordinary index of refraction and $\Gamma$ is the spatial overlap of the applied electric field $E_x$ with the optic fields ($0 \leq \Gamma \leq 1$).

TE-TM phase shifting is induced in a similar way as in the embodiment of modulator 101 shown in FIG. 2 by applying opposite drive voltages V(t)=−V'(t) to side electrodes 203 and 204.

The drive voltage V(t) and V'(t) applied to electrodes 203 and 204, respectively, are $$V(t) = V_0 \sin(2\pi f t) + V_\pi \cos(2\pi f t) + V_T \text{ and} \quad (5)$$

$$V'(t) = V_0 \sin(2\pi f t) - V_\pi \cos(2\pi f t) - V_T, \quad (6)$$

where $V_0$ is the voltage that induces complete TE-TM mode conversion ($\eta = \pi$), $V_\pi$ is the voltage that induces a TE-TM phase shift of $\pi(\Delta\phi = \pi)$, and $V_T$ is the voltage that reduces the residual, static birefringence in waveguide 202 substantially to zero (0).

When driven by the drive voltages V(t) and V'(t) of equations (5) and (6), polarization modulator 101 acts like a rotating half-wave plate spinning at a constant angular velocity of $\pi f$.

In the example shown in FIG. 3, polarization modulator 101 operates to modulate an incoming optical information signal 102 being launched at a linearly polarized state of arbitrary orientation relative to the X and Y axes. In response to the drive voltages noted above, the SOP of the optical signal 103 emerging from polarization modulator 101 traces the entire equatorial circle upon the Poincaré sphere continuously in the same direction at a constant angular velocity of $2\pi f$. The periodic sequence of polarization states of the output optical signal 103 emerging from the polarization modular is as shown in FIG. 3. Output optical signal 103 is always linearly polarized and passes through the following sequence: 45° linear, 0° linear, −45° linear, 90° linear, 45° linear and repeating itself. It is noted that the polarization state of the optical information signal 102 can be arbitrary linear. The polarization sequence of output optical signal 103 may then begin at a different state. Additionally, the polarization sequence of output optical signal 103 may also pass through the above noted sequence in the opposite direction. The tracing of the equatorial circle at a constant speed is realized here by employing sinusoidal drive voltages, which allow substantially higher modulation frequencies than the sawtooth voltages required in the embodiment of FIG. 2.

Figure 4:
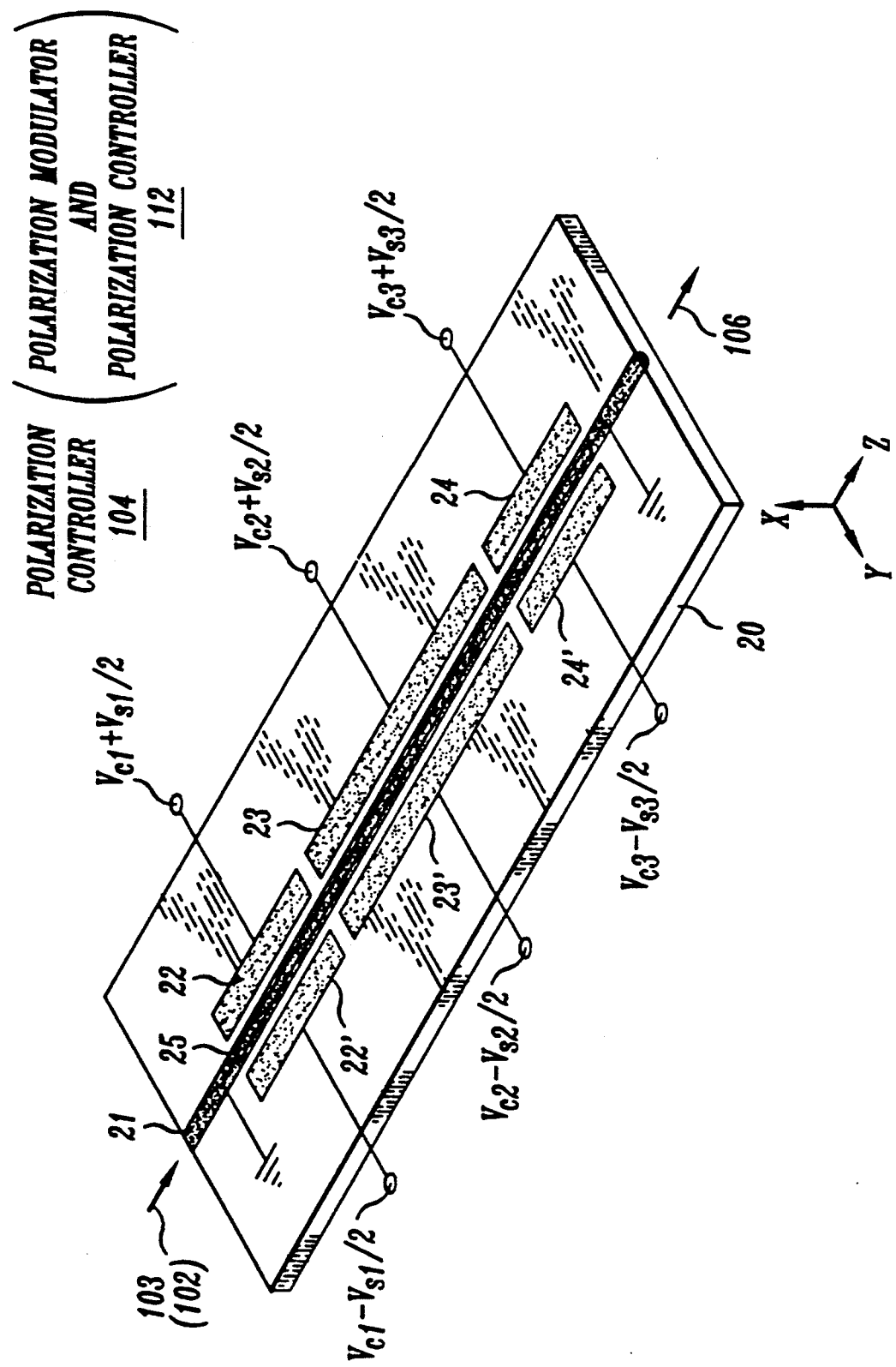
FIG. 4 shows a view of a waveguide and electrode structure which can be employed for the polarization controller of FIG. 1 and for the combined polarization modulator and polarization controller of FIG. 7.

An integrated-optic realization of the polarization controller 104 is shown in FIG. 4. The polarization controller 104 is fabricated on a low birefringence, X-cut, Z-propagation LiNbO$_3$ substrate 20 and operates with a standard titanium-indiffused, single-mode waveguide 21. It employs three cascaded electrode sections each of which acts as an endlessly rotatable fractional-wave element. Each section induces an adjustable combination of TE⇌TM mode conversion and relative TE-TM phase shifting, that is, linear birefringence of adjustable orientation but constant phase retardation. TE⇌TM mode conversion is accomplished via the $r_{61}$ electro-optic coefficient by applying common drive voltage component $V_{Ci}$, where i=1, 2, or 3, to the section electrode pairs on either side of electrode 25 on top of waveguide 21, namely, electrodes 22-22', electrodes 23-23', and electrodes 24-24', while TE-TM phase shifting is accomplished via the $r_{22}$ and $r_{12}$ electro-optic coefficients by applying balanced drive voltage components $V_{si}/2$ and $-V_{si}/2$ to the section electrode pairs on either side of electrode 25. Center electrode 25 over waveguide 21 is shown connected to ground potential. It is understood that the drive voltage components and the ground potential may be applied in different combinations to the three electrodes (e.g., electrodes 22, 22', and 25) in a particular section.

The first electrode section comprising electrodes 22 and 22' and grounded electrode 25 is driven by voltages $$V_{C1} = (V_0/2)\sin\alpha \text{ and} \quad (7)$$

$$V_{S1} = V_T + (V_\pi/2)\cos\alpha. \quad (8)$$

When driven by the voltages of equations (7) and (8), the first section of the integrated-optic device acts like a quarter-wave plate oriented at a variable angle $\alpha/2$.

The second electrode section comprising electrodes 23 and 23' and grounded electrode 25 is driven by voltages $$V_{C2} = V_0 \sin\gamma \text{ and} \quad (9)$$

$$V_{S2} = V_T + V_\pi \cos\gamma. \quad (10)$$

When driven by the voltages of equations (9) and (10), the second section of the integrated-optic device acts like a half-wave plate oriented at a variable angle $\gamma/2$.

The third electrode section comprising electrodes 24 and 24' together with grounded electrode 25 is driven by voltages $$V_{C3} = (V_0/2)\sin\delta \text{ and} \quad (11)$$

$$V_{S3} = V_T + (V_\pi/2)\cos\delta. \quad (12)$$

When driven by the voltages of equations (11) and (12), the third section of the integrated-optic device acts like a quarter-wave plate oriented at a variable angle $\delta/2$.

In the equations defining the drive voltages to all three electrode sections described above, $V_0$ denotes the bias voltage required for complete TE$\rightleftarrows$TM mode conversion and $V_\pi$ denotes the bias voltage for inducing a TE-TM phase shift of $\pi$. Additional bias voltage $V_T$ is applied to compensate for any static birefringence in the waveguide. In an illustrative example of polarization controller 104 in operation at a wavelength of $\lambda = 1.5$ μm, the bias voltages were determined to be $V_0 \approx 19$V, $V_\pi \approx 26$V and $V_T \approx 54$V, where the polarization controller 104 has a length of approximately 5.2 cm.

The overall transfer matrix of the entire cascade of elements for controller 104 shown in FIG. 4 is then given by $$\underline{T} = \begin{pmatrix} A - jB & -C - jD \\ C - jD & A + jB \end{pmatrix}, \quad (13)$$

with $A = -\cos\bar{\gamma}\cos(\delta/2 - \alpha/2)$ $B = -\sin\bar{\gamma}\sin(\delta/2 + \alpha/2)$ $C = -\cos\bar{\gamma}\sin(\delta/2 - \alpha/2)$ $D = +\sin\bar{\gamma}\cos(\delta/2 + \alpha/2)$ $$\bar{\gamma} = \gamma - \alpha/2 - \delta/2. \quad (14)$$

The matrix T describes general elliptical birefringence, where (2arcsin B) is the total amount of induced linear phase retardation at 0° (TE-TM phase shifting), (2arcsin D) is the amount of induced line phase retardation at 45° (TE$\leftrightarrow$TM mode conversion), and (2arcsin C) is the amount of circular phase retardation. The total amount of induced elliptical phase retardation $\Psi$ is given by $\cos\Psi = 2A^2 - 1$.

The polarization controller 104 of FIG. 4 allows general polarization transformations from any arbitrary input state of polarization to any arbitrary output state of polarization. The transformation range of controller 104 is essentially unlimited if the three phase parameters of $\alpha$, $\gamma$ and $\delta$ in the drive voltages are substantially endlessly adjustable. Moreover, automatic polarization control does not require a sophisticated polarization analyzer or control circuit. As evident from FIG. 1, the values for the parameter $\alpha$, $\gamma$ and $\delta$ for a desired polarization transformation can be found by monitoring the SNR in the receiver at the remote end of the optical transmission network. The drive voltages can be generated by an entirely analog or digital electronic feedback circuit which automatically adjusts the three parameters in the voltages for maximum SNR at the remote receiver. This is achieved by dithering $\alpha$, $\gamma$ and $\delta$ independently in mutually exclusive time intervals and detecting the resulting (small) changes in the SNR at the extreme dither excursions via phase-sensitive detectors. It is then possible to maximize the SNR by minimizing the gradient in the measured SNR values. In this application, the dither frequency is substantially lower than the modulation frequency of polarization modulator 101, such that the measured SNR value is averaged over at least one modulation cycle of modulator 101. The modulated output SOP of modulator 101, which traces a great circle on the Poincaré sphere is transformed by polarization controller 104 into another modulated SOP, which traces another great circle on the Poincaré sphere, in such a way that the average SNR value of the optical signal 109 received at the far end of the optical transmission network 107 is at a maximum value.

Figure 5:
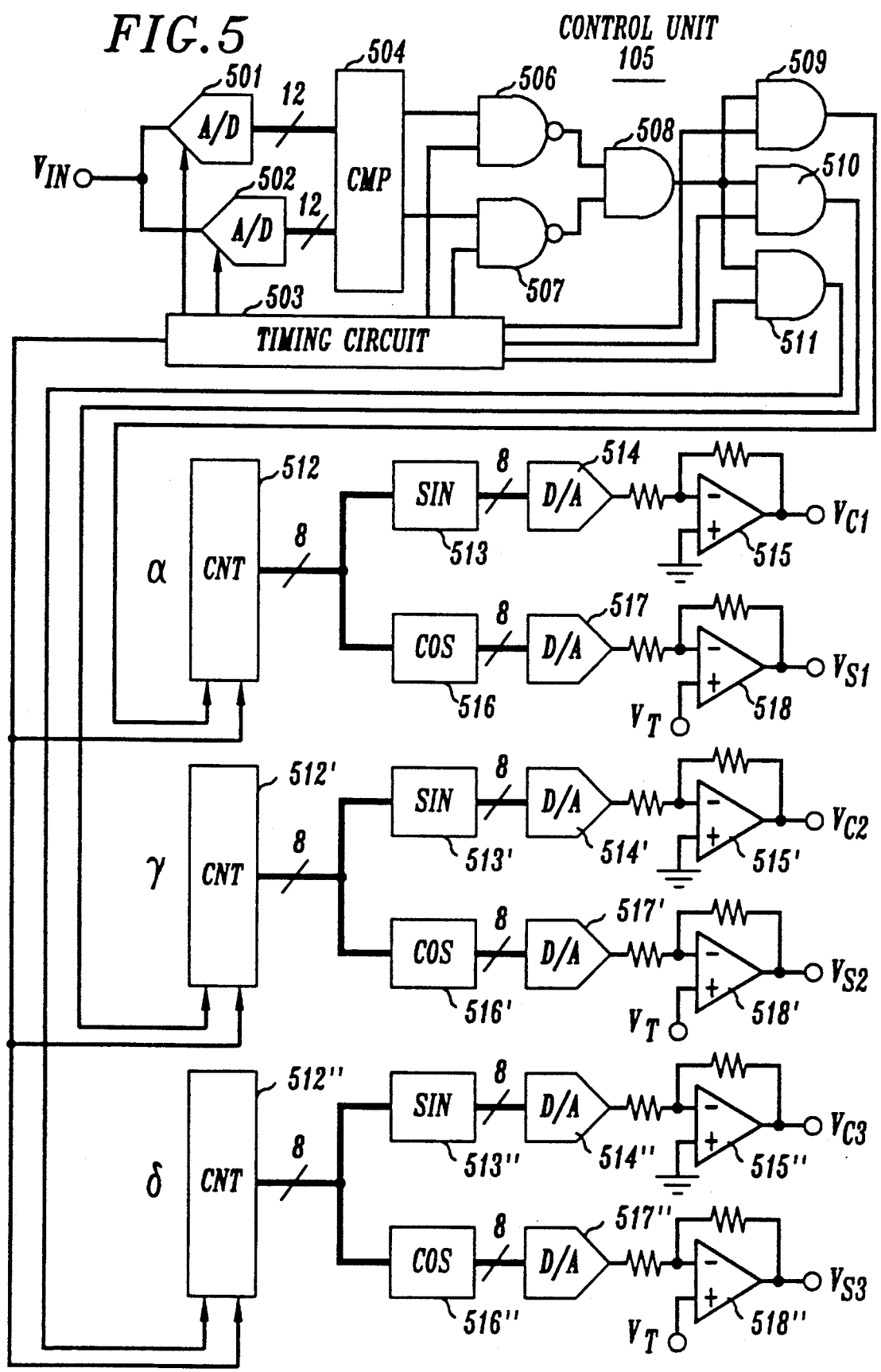
FIG. 5 shows, in simplified block diagram form, a digital control circuit for use with the polarization controller of FIG. 4 in the embodiment of FIG. 1.

In an illustrative embodiment of the polarization controller 104, a digital control circuit 105 as shown in FIG. 5 is employed to monitor the SNR value of the optical signal 109 being received at a remote location and to generate the proper drive voltages to select the great circle to be traced in order to maximize the SNR value. Moreover, the drive voltages for both outermost fractional wave elements supplied to electrodes 22, 22' and 24, 24' may either be adjusted independently or in a manner that maintains an arbitrary, but constant angular offset between the orientations of the two fractional wave elements with respect to the same principal axis of both elements. That is, both fractional wave elements are controlled to rotate synchronously so that an offset angle $\epsilon/2 = (\delta - \alpha)/2$, is maintained constant between these two elements.

FIG. 5 shows, in simplified form, control unit 105 which comprises a phase sensitive detector section, a clock gating section, and three digital sine-wave generators and a plurality of amplifiers for yielding control voltages $V_{C1}$, $V_{S1}$, $V_{C2}$, $V_{S2}$, $V_{C3}$ and $V_{S3}$. The phase sensitive detector section includes analog/digital (A/D) converters 501 and 502 which are employed to obtain values of the SNR at the two extreme dither excursions under control of timing signals from timing circuit 503. A/D 501 obtains a SNR value (A) at a first extreme dither excursion and A/D 502 obtains a SNR value (B) at the other extreme dither excursion. Comparator 504 compares the A and B SNR values and generates control signals for NAND gates 506 and 507. Specifically, with the value of A>B, a first output from comparator 504 causes NAND gate 506 to yield an output which disables AND gate 508 during a first predetermined portion of a counter adjustment cycle of up/down (U/D) counters 512-512" as controlled by timing circuit 504. This in turn, causes a decrease in the number of clock pulses being supplied to the respective ones of U/D counters 512-512" during the count-up cycles in their independent adjustment intervals. As indicated above, in this example, $\alpha$, $\delta$ and $\gamma$ are dithered in mutually independent time intervals under control of timing circuit 503 and AND gates 509, 510 and 511, respectively. Similarly, with the value of B>A, a second output from comparator 504 causes NAND gate 507 to yield an output which disables AND gate 508 during a second predetermined portion of the counter adjustment cycle of U/D counters 512-512" as controlled by timing circuit 504. This in turn, causes a decrease in the number of clock pulses being supplied to the respective ones of counters 512-512" during the count-down cycles in their independent adjustment intervals.

Since all of the sine-wave generators are the same, only the generator which is responsive to $\alpha$ is described in detail. Thus, the $\alpha$-responsive sine-wave generator includes, in addition to U/D counter 512, a read only memory (ROM) 513 for storing the sine (SIN) values corresponding to the dithered $\alpha$ value in counter 512. The output sine value from ROM 513 is converted to analog form via D/A converter 514 and supplied to amplifier 515 which, in turn, yields drive voltage $V_{C1}$, as defined in equation (7). Similarly, ROM 516 stores cosine (COS) values corresponding to the dithered $\alpha$ value in counter 512. The output cosine value from ROM 516 is converted to analog form via D/A converter 517 and supplied to amplifier 518. Also potential $V_T$ is supplied to amplifier 518 which, in turn, yields drive voltage $V_{S1}$, as defined in equation (8).

Polarization modulator 101 and polarization controller 104 in FIG. 1 may be fabricated as separate devices, in which case they may be connected by an optical transmission line, such as an optical fiber. Alternatively, they could be integrated as a single device, in particular in the case of the integrated-optical modulators and controllers shown in FIGS. (2), (3) and (4), respectively. It is further possible to integrate the function of the polarization modulator with the polarization controller on the controller shown above in FIG. (4), without the addition of a separate modulation section.

This is easily shown for a modulator 101 of the type shown in FIG. 3, and described above, which acts like a rotating half-wave plate spinning at an angular velocity $\omega/2$. Such operation is described by the Jones matrix $$\underline{H}(\omega t) = \begin{pmatrix} -j\cos(\omega t) & -j\sin(\omega t) \\ -j\sin(\omega t) & j\cos(\omega t) \end{pmatrix}. \quad (15)$$

Likewise, the transfer matrix of the polarization controller 104, as indicated above, is given by equations (13) and (14).

The overall transfer matrix of the polarization modulator 101 followed by the polarization controller 104 is then given by the matrix $$\underline{M}(\omega t) = \underline{T} \cdot \underline{H}(\omega t) = j \begin{pmatrix} \tilde{A} - j\tilde{B} & -\tilde{C} - j\tilde{D} \\ \tilde{C} - j\tilde{D} & \tilde{A} + j\tilde{B} \end{pmatrix}. \quad (16)$$

with $\tilde{A} = -\cos\tilde{\gamma}\cos(\delta/2 - \alpha/2 + \omega t)$ $\tilde{B} = -\sin\tilde{\gamma}\sin(\delta/2 + \alpha/2 + \omega t)$ $\tilde{C} = -\cos\tilde{\gamma}\sin(\delta/2 - \alpha/2 + \omega t)$ $\tilde{D} = +\sin\tilde{\gamma}\cos(\delta/2 + \alpha/2 + \omega t)$. \quad (17)

Figure 6:
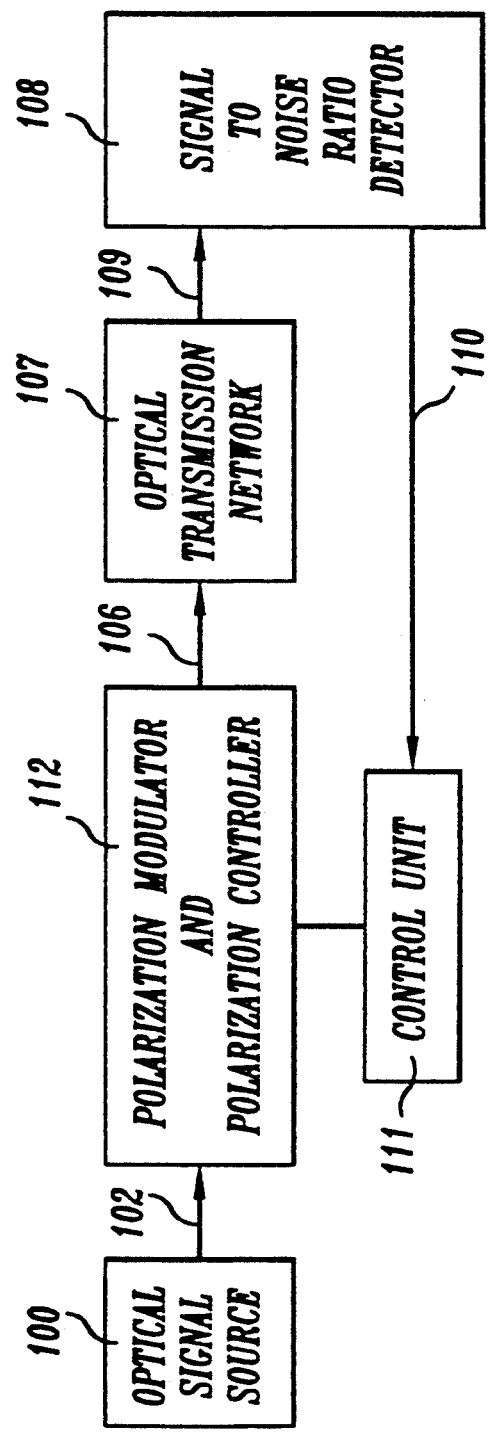
FIG. 6 is a simplified block diagram of an arrangement including a combined polarization modulator and polarization controller which facilitates the practice of the invention.

Since $M(\omega t)$ has a form similar to the transfer matrix T, $M(\omega t)$ can simply be obtained by using only the polarization controller 104 of FIG. 5 (i.e., polarization modulator and polarization controller 112 of FIG. 6) and driving it with voltages from control unit 111 of the form:

$V_{C1} = (V_0/2)\sin\alpha$ and \quad (18)

$V_{S1} = V_T + (V_\pi/2)\cos\alpha$, \quad (19)

$V_{C2} = V_0\sin(\gamma + \omega t)$ and \quad (20)

$V_{S2} = V_T + V_\pi\cos(\gamma + \omega t)$, and \quad (21)

$V_{C3} = (V_0/2)\sin(\delta + 2\omega t)$ and \quad (22)

$V_{S3} = V_T + (V_\pi/2)\cos(\delta + 2\omega t)$. \quad (23)

As indicated, FIG. 6 shows, in simplified form, another arrangement employing an embodiment of the invention. The arrangement of FIG. 6 is essentially identical to the arrangement of FIG. 4. The only differences are that a single polarization modulator and polarization controller 112 is shown and control unit 111 generates voltages as described above in equations (18) through (23). The physical embodiment of polarization modulator and polarization controller 112 is identical to the device shown in FIG. 4 and described above.

Figure 7:
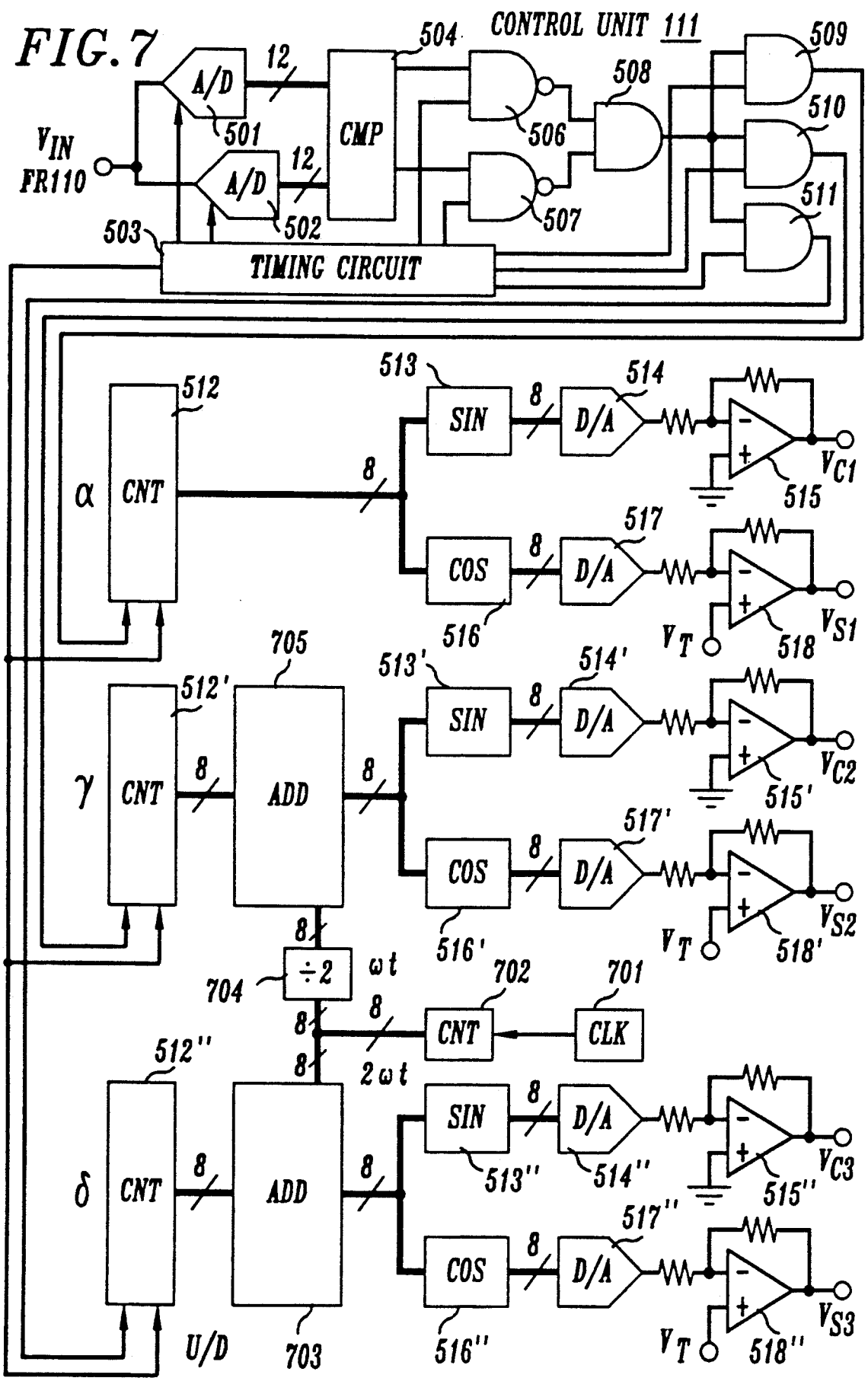
FIG. 7 shows, in simplified block diagram form, a digital control circuit for use with the combined polarization modulator and polarization controller in the arrangement of FIG. 6.

As described above, control unit 111 generates the voltages defined by equations (18) through (23) and is shown, in simplified form, in FIG. 7. The elements that are identical to those of control unit 105 shown in FIG. 5 have been similarly numbered and will not be described again. Elements including clock generator (CLK) 701, counter (CNT) 702, adder (ADD) 703, divide-by-two ($\div 2$) 704 and adder (ADD) 705 have been added in order to generate and add the $\omega t$ term in equations (20) and (21) and the $2\omega t$ term in equation (22) and (23). Otherwise, the structure and operation of control unit 111 is identical to that of control unit 105 described above.

The above-described arrangements are, of course, merely illustrative of applications of the invention. Other arrangements may be devised by those skilled in the art without departing from the spirit or scope of the invention. It should be further understood by those skilled in the art that although a titanium-indiffused waveguide structure for a lithium niobate polarization modulator and/or polarization controller is the preferred design, other waveguide formations are contemplated and other substrates may be employed including, but not limited to semiconductor materials and lithium tantalate, for example. It is in particular noted that polarization controller 104 in combination with signal-to-noise ratio detector 108 and control unit 105 may also effectively be used to reduce other polarization-dependent effects in optical transmission network 107 that decrease the SNR of the optical transmission system, such as but not limited to polarization mode dispersion. Additionally, it will be apparent that other parameters of the received optical signal may equally be employed in the feedback control loop for controlling the polarization controller in order to reduce the polarization-dependent effects in the optical transmission system.

We claim:

1. Apparatus intended for use in reducing the effects of polarization dependent hole-burning and polarization dependent loss in an optical transmission system employing optical fiber amplifiers, the apparatus comprising:

means for generating a polarized optical signal;

means for modulating the state of polarization of said polarized optical signal periodically between first and second states of polarization in at least one pair of orthogonal states of polarization so that substantially equal time is spent in each of the first and second states of polarization to generate a modulated optical signal; and means for controllably transforming said modulated states of polarization of said modulated optical signal.

2. The apparatus as defined in claim 1 wherein said means for controllably transforming includes means responsive to a representation of a predetermined parameter of an optical signal received at a remote end of the optical transmission system for selecting the transformation of the modulated states of polarization so that said predetermined parameter is maintained at a prescribed value.

3. The apparatus as defined in claim 2 wherein said means for modulating generates a predetermined sequence of states of polarization.

4. The apparatus as defined in claim 3 wherein said means for modulating includes waveguide means having an electrooptically induced birefringence at a desired wavelength of operation and means for varying the orientation of linear birefringence of the waveguide and for introducing a predetermined phase retardation between said first and second orthogonal states of polarization of the optical signal wherein the predetermined phase retardation is substantially equal to $\pi$ radians when at least one of the states of polarization is substantially parallel to at least one of the principle axes of the linear birefringence.

5. The apparatus as defined in claim 4 wherein said means for controllably transforming transforms said sequence of states of polarization of said modulated optical signal into a preferred sequence of states of polarization in order to maintain said parameter at said prescribed value.

6. The apparatus as defined in claim 5 wherein said means for modulating modulates the states of polarization of the optical signal so that said predetermined sequence of states of polarization traces periodically a full great circle on the Poincaré sphere and wherein said means for controllably transforming selects the preferred full great circle being traced on the Poincaré sphere.

7. The apparatus as defined in claim 5 further including means at a remote end of said optical transmission system for generating a representation of said predetermined parameter and means for supplying said representation to said means for controllably transforming.

8. The apparatus as defined in claim 7 wherein said means for transforming comprises a polarization controller.

9. The apparatus as defined in claim 7 wherein said predetermined parameter is representative of a signal to noise ratio of the optical signal received at said remote end of the optical transmission system and said prescribed value is a maximum value.

10. The apparatus as defined in claim 3 wherein said means for modulating includes waveguide means having an electrooptically induced birefringence at a desired wavelength of operation and means for controllably varying a phase retardation between said first and second orthogonal states of polarization of the optical signal wherein the induced birefringence of the waveguide is at a predetermined orientation.

11. The apparatus as defined in claim 10 wherein said means for controllably transforming transforms said sequence of states of polarization of said modulated optical signal into a preferred sequence of states of polarization in order to maintain said parameter at said prescribed value.

12. The apparatus as defined in claim 11 wherein said means for modulating modulates the states of polarization of the optical signal so that said predetermined sequence of states of polarization traces periodically a great circle on the Poincaré sphere and wherein said means for controllably transforming selects the preferred great circle being traced on the Poincaré sphere.

13. The apparatus as defined in claim 12 wherein said means for modulating modulates the states of polarization of the optical signal so that said predetermined sequence of states of polarization traces periodically a full great circle on the Poincaré sphere and wherein said means for controllably transforming selects the preferred full great circle being traced on the Poincaré sphere.

14. The apparatus as defined in claim 11 further including means at a remote end of said optical transmission system for generating a representation of said predetermined parameter and means for supplying said representation to said means for controllably transforming.

15. The apparatus as defined in claim 14 wherein said means for transforming comprises a polarization controller.

16. The apparatus as defined in claim 14 wherein said predetermined parameter is representative of a signal to noise ratio of the optical signal received at said remote end of the optical transmission system and said prescribed value is a maximum value.

17. A method intended for use in reducing the effects of polarization dependent hole-burning and polarization dependent loss in an optical transmission system employing optical fiber amplifiers, the method comprising the steps of:

generating a polarized optical signal;

modulating the state of polarization of said polarized optical signal periodically between first and second states of polarization in at least one pair of orthogonal states of polarization so that substantially equal time is spent in each of the first and second states of polarization to generate a modulated optical signal; and controllably transforming said modulated states of said modulated optical signal.

18. The method as defined in claim 17 wherein said step of controllably transforming includes being responsive to a representation of a predetermined parameter of an optical signal received at a remote end of the optical transmission system for selecting the transformation of the modulated states of polarization so that said predetermined parameter is maintained at a prescribed value.

19. The method as defined in claim 18 wherein said step of modulating generates a predetermined sequence of states of polarization.

20. The method as defined in claim 19 wherein said step of modulating employs waveguide means having an electrooptically induced birefringence at a desired wavelength of operation and further includes a step of varying the orientation of linear birefringence of the waveguide and for introducing a predetermined phase retardation between said first and second orthogonal states of polarization of the optical signal wherein the predetermined phase retardation is substantially equal to $\pi$ radians when at least one of the states of polarization is substantially parallel to at least one of the principle axes of the linear birefringence.

21. The method as defined in claim 20 wherein said step of controllably transforming transforms said sequence of states of polarization of said modulated optical signal into a preferred sequence of states of polarization in order to maintain said parameter at said prescribed value.

22. The method as defined in claim 21 wherein said step of modulating modulates the states of polarization of the optical signal so that said predetermined sequence of states of polarization traces periodically a full great circle on the Poincaré sphere and wherein said step of controllably transforming selects the preferred full great circle being traced on the Poincaré sphere.

23. The method as defined in claim 21 further including the steps of generating a representation of said predetermined parameter at a remote end of said optical transmission system and supplying said representation to control said transforming of said states of polarization.

24. The method as defined in claim 19 wherein said step of modulating employs waveguide means having an electrooptically induced birefringence at a desired wavelength of operation and a step of controllably varying a phase retardation between said first and second orthogonal states of polarization of the optical signal wherein the induced birefringence of the waveguide is at a predetermined orientation.

25. The method as defined in claim 24 wherein said step of controllably transforming transforms said sequence of states of polarization of said modulated optical signal into a preferred sequence of states of polarization in order to maintain said parameter at said prescribed value.

26. The method as defined in claim 25 further including the steps of generating a representation of said predetermined parameter at a remote end of said optical transmission system and supplying said representation to control said transforming of said states of polarization.

27. The method as defined in claim 26 wherein said predetermined parameter is representative of a signal to noise ratio of the optical signal received at said remote end of the optical transmission system and said prescribed value is a maximum value.

28. The method as defined in claim 25 wherein said step of modulating modulates the states of polarization of the optical signal so that said predetermined sequence of states of polarization traces periodically a great circle on the Poincaré sphere and wherein said step of controllably transforming selects the preferred great circle being traced on the Poincaré sphere.

29. The method as defined in claim 28 wherein said step of modulating modulates the states of polarization of the optical signal so that said predetermined sequence of states of polarization traces periodically a full great circle on the Poincaré sphere and wherein said step of controllably transforming selects the preferred full great circle being traced on the Poincaré sphere.

* * * * *